United States Patent Office 3,539,571
Patented Nov. 10, 1970

3,539,571
BIS-2-METHOXY ETHYL SULFONYL PIPERAZINES
Giuliana C. Tesoro, Dobbs Ferry, N.Y., and Richard N. Ring, Wood-Ridge, N.J., assignors to J. P. Stevens & Co., Inc., New York, N.Y., a corporation of Delaware
No Drawing. Continuation-in-part of application Ser. No. 301,875, Aug. 13, 1963. Division of application Ser. No. 337,997, Jan. 16, 1964. This application June 12, 1967, Ser. No. 656,613
Int. Cl. C07d 51/70
U.S. Cl. 260—268                2 Claims

ABSTRACT OF THE DISCLOSURE

Sulfonamide compounds containing at least two reactive terminal groups of the formula:

$$YSO_2-N<$$

wherein Y can be vinyl, alkoxy or hydroxy or salt type terminal groups. These compounds can be used for reaction with active hydrogen containing polymeric material such as for treatment of cellulosic textiles. Substituted piperazine compounds and triazine type compounds are disclosed.

---

The present application is a divisional of application Ser. No. 337,997, filed Jan. 16, 1964, now abandoned. This application is also a continuation-in-part application of copending application Ser. No. 301,875, filed Aug. 13, 1963, now abandoned. The complete disclosure thereof is incorporated herein by reference.

The present invention relates to sulfonamide compounds and methods of making them, and more particularly to sulfonamide compounds that are particularly valuable for the chemical modification of polymers containing active hydrogen atoms, as crosslinking agents for cellulosic polymers.

Sulfonamide compounds of the present invention are characterized by the presence of at least one functional group that is capable of reacting with the active hydrogen atoms of various polymeric materials as well as acting as sites for polymerization.

Accordingly, it is an object of the present invention to provide sulfonamide compounds containing at least one reactive functional group.

It is a further object of the present invention to provide reactive sulfonamide compounds capable of reacting with active hydrogen containing polymeric materials for the chemical modification thereof.

It is a further object of the present invention to provide symmetrical and unsymmetrical polyfunctional sulfonamide compounds.

It is a further object of the present invention to provide methods for making certain sulfonamide compounds that can be employed for the modification of active hydrogen-containing polymeric materials.

In attaining the above objects, one feature of the present invention resides in certain novel sulfonamide compounds which contain at least one terminal group capable of reaction with the active hydrogen atoms of various polymeric materials in general, and in particular with the hydroxyl groups of cellulosic textile materials.

Another feature of the present invention resides in certain sulfonamide compounds which contain at least two reactive terminal groups.

Other objects, features and advantages of the present invention will become apparent from the following detailed description thereof.

The sulfonamide compounds of the present invention are characterized in that they contain at least one reactive terminal group of the formula:

$$YSO_2-N<$$

More particularly, the sulfonamide compounds of the present invention may be represented by the formulae:

(I) 

and (II) 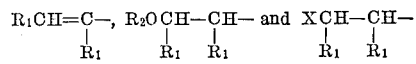

wherein Y is selected from the group consisting of

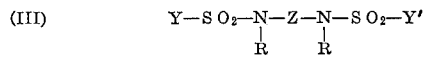

wherein $R_1$ is a member selected from the group consisting of hydrogen and lower alkyl groups, $R_2$ is a member selected from the group consisting of hydrogen and lower alkyl, X is the conjugate base of a Lowry-Bronsted acid which has a dissociation constant in water between $5 \times 10^{-2}$ and $5 \times 10^{-5}$, R is a member selected from the group consisting of hydrogen, alkyl, hydroxyalkyl and alkoxyalkyl, Q represents substituted and unsubstituted aliphatic and alicyclic groups, and D is a part of a heterocyclic ring of which the nitrogen atom is also a part and which heterocyclic ring may be substituted or unsubstituted.

Compounds which come within the scope of Formula I given above include polyfunctional sulfonamide compounds represented by the structural formula (III)   $Y-SO_2-N-Z-N-SO_2-Y'$
              $\quad\quad\ \ \ |\quad\quad\ |$
              $\quad\quad\ \ \ R\quad\quad R$ wherein Y and Y' are members selected from the group consisting of

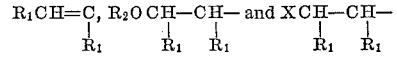

wherein $R_1$ is a member selected from the group consisting of hydrogen and lower alkyl; i.e. 1 to 5 carbon atoms, $R_2$ is a member selected from the group consisting of hydrogen and lower alkyl, X is the conjugate base of a Lowry-Bronsted acid which has a dissociation constant in water between $5 \times 10^{-2}$ and $5 \times 10^{-5}$, R is a member selected from the group consisting of hydrogen, lower alkyl from 1 to 5 carbon atoms, hydroxyalkyl, e.g. —$CH_2OH$, —$CH_2CH_2OH$, and alkoxyalkyl, e.g. —$CH_2OCH_3$, —$CH_2CH_2OC_2H_5$, and Z is a divalent aliphatic or alicyclic group and is selected from the group consisting of alkylene groups of the formula:

$$-C_nH_{2n}-$$

wherein $n$ is an integer with a value of 1 to 10, polyoxyethylene groups of the formula:

$$-(C_2H_4O)_mC_2H_4-$$

wherein $m$ is an integer with a value of 1 to 20, polyoxypropylene groups with the formula:

$$-(C_3H_6O)_mC_3H_6-$$

in which $m$ is an integer with a value of 1 to 20, and hydroxyalkylene groups of the formula:

$$C_nH_{2n-x}(OH)_x$$

wherein $n$ has a value of 3 to 10 and $x$ has a value of 1 to 4, e.g.

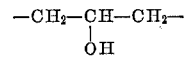

Heterocyclic compounds represented by Formula II above include compounds represented by the structural formula (IV) 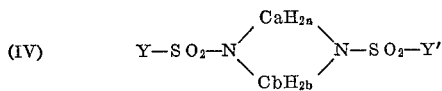

wherein Y and Y' have the meaning previously given above and $a$ and $b$ are integers with a value of 1 to 6. The heterocyclic ring can be substituted or unsubstituted.

Further compounds which come within the scope of Formula II above are trifunctional sulfonamide compounds represented by the structural formula:

(V) 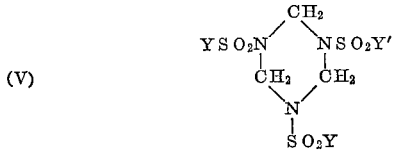

wherein Y and Y' have the meaning given above.

Unsymmetrical polyfunctional compounds which come within the Formula I can be represented by the structural formula:

(VI) 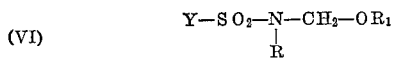

wherein Y, R and $R_1$ have the meanings previously given above.

In these compounds the N-methylol grouping

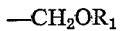

is capable of reaction with active hydrogen-containing polymers under certain conditions while the reactive grouping Y as defined above will react with the polymers under a different set of reaction conditions. For example, in general, the reactive groups Y identified above will react under alkaline conditions whereas the N-methylol groupings —$CH_2OR_1$ will react under acidic conditions. Because of these factors, the unsymmetrical compounds above are particularly valuable for the step-wise modification of cellulosic textiles.

Other unsymmetrical polyfunctional compounds included by generic Formulae I and II are compounds wherein the radical Q and D contain a reactive grouping other than

>$NSO_2$—Y such as, for example, a grouping represented by the structural formula

>NCOY wherein the reactivity differs from that of the

>$NSO_2Y$ grouping.

Monofunctional compounds included among the compounds represented by Formula I which contain groups capable of imparting desirable properties to polymers which are reacted with the sulfonamide compounds are represented by the structural formula:

(VII) 

wherein Y and R have the same meaning previously given above, and $R_3$ is a member selected from the group consisting of substituted and unsubstituted aliphatic hydrocarbon groups containing, for example, from 8 to about 20 carbon atoms. Hydrophobic substituents such as fluoroalkyl groups of the formula $C_nH_{2n+1-x}F_x$ wherein $n$ has a value of 8 to 20 and $x$ has a value of 2 to 41, are particularly valuable for the chemical modification of cellulosic textiles in order to impart water repellency.

Further monofunctional compounds included among the compounds represented by Formula II are heterocyclic compounds represented by the structural formula:

(VIII) 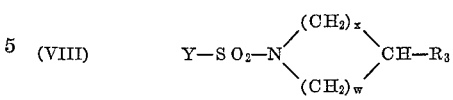

wherein Y and $R_3$ have the meaning previously given above and $x$ and $w$ are integers with a value of 1 to 3.

The group X which forms a part of the terminal grouping of certain of the sulfonamides of the present invention is defined as the conjugate base of a Lowry-Brønsted acid and has a dissociation constant in water between $5 \times 10^{-2}$ and $5 \times 10^{-5}$ and includes polar residues derived from a reagent of weak nucleophilic character.

Included and illustrative of these polar residues but non-limiting thereof are the following groupings:

| | |
|---|---|
| Sulfate | —$OSO_3M$ |
| Thiosulfate | —$SSO_3M$ |
| Formate | —$OCOH$ |
| Pyridinium | —$NC_5H_5$ + |

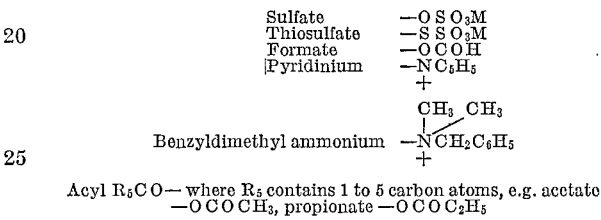

Acyl $R_5CO$— where $R_5$ contains 1 to 5 carbon atoms, e.g. acetate —$OCOCH_3$, propionate —$OCOC_2H_5$ wherein M is an alkali metal, e.g. Na, K, Li, or ammonium.

Illustrative of the sulfonamide compounds of the present invention and included by the various formulae defined above are the following:

TABLE I

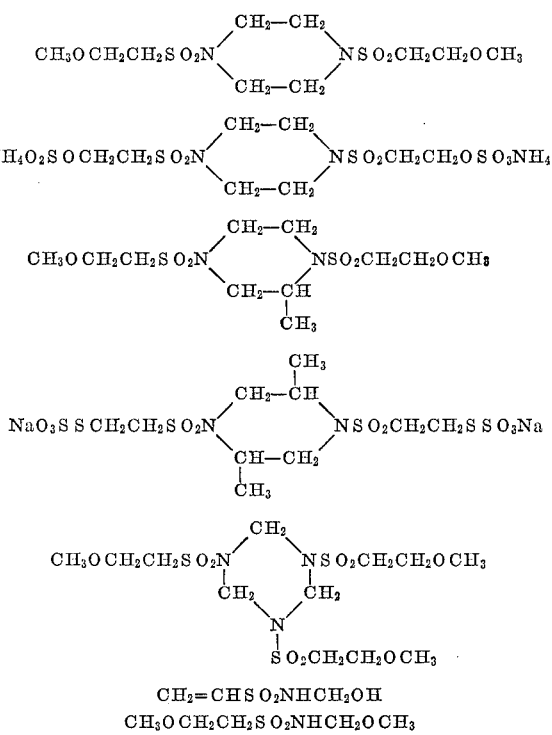

$CH_2=CHSO_2NHCH_2OH$
$CH_3OCH_2CH_2SO_2NHCH_2OCH_3$

The above compounds are illustrative of the compounds of the present invention and not limiting in the scope thereof. It is understood that the various substituent groupings can be substituted one for another into the various generic Formulae I through VIII to obtain the novel compounds of the present invention.

Compounds of the present invention may be prepared in one of several reactions as determined by the particular structure of the desired compounds. Illustrative of the reactions which are generally suitable for the preparation of sulfonamide compounds is the reaction of a sulfonyl chloride with an amine represent by the reaction 1:

1. 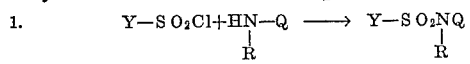

wherein Y, R and Q have the meanings previously ascribed to them.

Heterocyclic compounds can be prepared in a similar manner by employing a heterocyclic amine as illustrated by the equation:

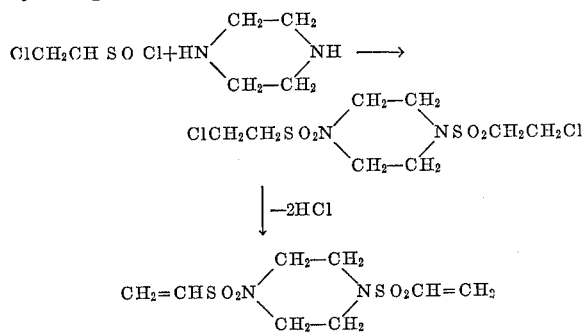

Further illustrating the basic reaction between the sulfonyl chloride and a diamine is the following equation:

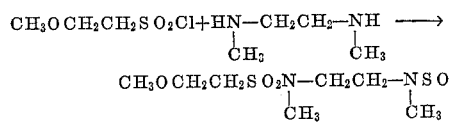

The reaction illustrated in the foregoing equations is generally suitable for the preparation of compounds of Formulae III, IV, VII and VIII.

An alternative method for the preparation of these compounds employs carbyl sulfate as shown in reaction 2.

2. Carbyl sulfate + amine

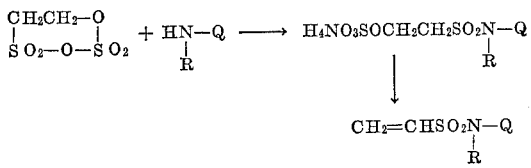

Illustrative of this basic reaction is that of piperazine with carbyl sulfate:

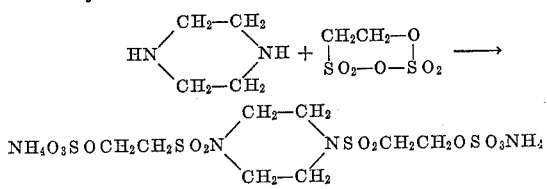

Unsymmetrical compounds containing the N-methylol group are preferably prepared by reaction of a suitable sulfonamide with formaldehyde as shown in reaction 3.

3. $YSO_2NH + HCHO \rightarrow YSONCH_2OH$

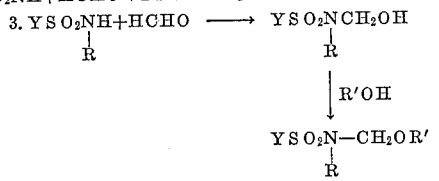

The symmetrical aliphatic compounds of Formula III can also be prepared by the reaction of a sulfonamide with formaldehyde as shown below:

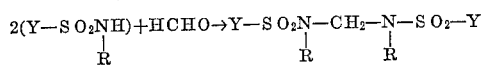

Similarly, the trifunctional compounds of Formula V can also be prepared from a sulfonamide and formaldehyde under suitable conditions as illustrated by the equation below:

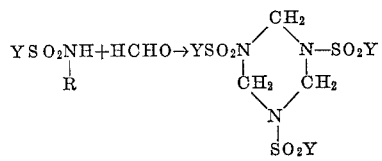

Although the conditions of reaction employed in the methods of preparation illustrated above can vary, it is generally preferred that the reaction between the sulfonyl chloride and the amine (Equation 1) take place at a low temperature, usually below 0° C., in the presence of an acid acceptor compound such as a tertiary amine. It is further desirable to employ an inert solvent or diluent in order to aid in cooling the reaction. When the desired monomeric product is unsaturated, a polymerization inhibitor should be used. If, on the other hand, a polymer is desired then reactions involving unsaturated compounds may be run at higher temperatures and omitting the polymerization inhibitor.

Reaction 2 takes place under conditions that can be considerably varied. Temperature ranges are not narrowly critical although generally care must be exercised in selecting reaction conditions for specific compounds since the rate of reaction of the amine with the carbyl sulfate in part depends on the structure of the amine used. Inert solvents may be used for cooling the reaction. Additionally, a polymerization inhibitor is used if the desired product obtained from the reaction is unsaturated.

The reaction conditions for the reaction 3 between formaldehyde and the sulfonamide are determinative of whether the N-methylol compounds of Formula IV are formed or the trifunctional perhydrotriazine compounds of Formula V are formed. When mild alkaline conditions are used in the presence of water the N-methylol compounds of Formula VI are formed whereas if the reaction conditions are strongly acidic the perhydrotriazine compounds will be formed.

Other methods of preparation can be employed in addition to the direct method by employing a sulfonyl chloride of suitable structure or an amide of suitable structure as illustrated in reaction 3. For example, the following equations illustrate some of the reactions that may be used to make the sulfonamide compounds of the present invention.

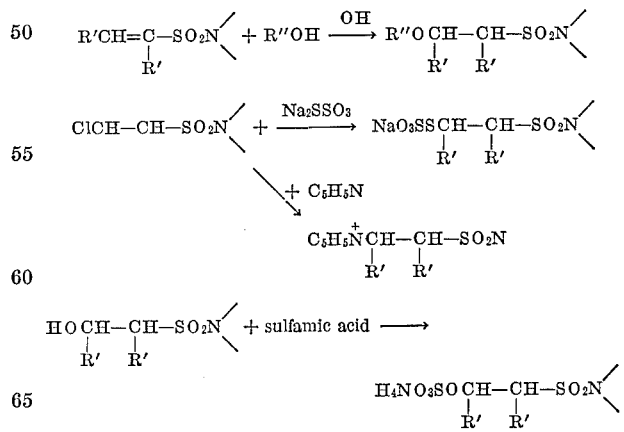

The following examples are illustrative of the present invention in that they show the preparation of representative sulfonamide compounds. It is to be understood that these examples are for purposes of illustration only and are not considered limiting of the invention in any way. The sulfonamide compounds of the present invention can be prepared by any one of the methods described in the following examples.

EXAMPLE I bis (vinylsulfonyl) piperazine

A solution of 2-chloroethanesulfonyl chloride (136.8 g. 0.84 mole) in 300 ml. tetrahydrofuran was slowly added to a stirred solution of recrystallized piperazine (33.6 g.; 0.39 mole) and triethylamine (169.5 g.; 1.68 mole) in 900 ml. of tetrahydrofuran at −70° C. over a period of 2.5 hours. The temperature of the mixture was slowly allowed to rise to room temperature and stirring was continued for several hours. The solid was removed by filtration, washed with three 500 ml. portions of water and dried. The crude product (53.6 g.; 52.6% purity by one hour vinyl analysis (determined by the dodecyl mercaptan method described in the Chemistry of Acrylonitrile, The American Cyanamid Co., second ed., N.Y. 1959, p. 61) using dodecyl mercaptan method) was recrystallized from acetonitrile and 31.0 g. (29.9% of theory) of product, M.P. 204.0–205.5° C. was obtained. The purity of the product by one hour vinyl analysis (dodecyl mercaptan method) was 88%.

EXAMPLE II bis (2-methoxyethanesulfonyl) piperazine

A solution of 25% sodium methylate (59.6 g.; 0.276 mole) in 200 ml. of methanol was slowly added to a stirred mixture of bis (vinylsulfonyl) piperazine (46.06 g.; 0.173 mole) and 100 ml. of methanol over a period of one hour at room temperature. The mixture was stirred overnight, filtered and dried. The crude product obtained (52.8 g.; 92.6% yield) melted at 145.0–147.0° and contained 1.7% vinyl as determined by the dodecyl mercaptan method. Recrystallization from isopropanol gave 31.1 g. of white needles. M.P. 146.0–147.0 C.

*Analysis.*—Calculated for $C_{10}H_{18}N_2S_2O_6$ (percent): C, 19.41; N, 8.48; $CH_3O$, 18.79. Found (percent): C, 20.00; N, 8.49; $CH_3O$, 21.79.

EXAMPLE III

1,4-bis-(vinylsulfonyl)-2,5-dimethyl piperazine

A solution of 2,5-dimethyl piperazine (32.2 g., 0.31 m.; 80% trans-20% cis), triethylamine (131 g., 1.30 m.) and hydroquinone (0.5 g.) in acetone (1000 ml.) was chilled to −10° C. 2-chloroethylsulfonyl chloride (106 g., 0.65 m.) was added to the solution dropwise with vigorous stirring while maintaining the internal temperature at −10 to −15° C. When the addition was complete, the solution was allowed to stir two hrs. while warming to room temperature and then left overnight.

Triethylamine hydrochloride (188 g., calc. 178 g.) was removed by filtration and the filtrate stripped of solvent at reduced pressure. The product was obtained as an oily syrup which was taken up in benzene and crystallized by the addition of hexane. The bis-vinyl sulfonamide was obtained in chunky, colorless crystals, M.P. 145–158° C. (40.7 g., 44% yield). The infrared spectrum of the product ($CHCl_3$ solution) showed maxima at 7.48 and 8.72 ($SO_2$) and 10.32μ (vinyl).

This sample was fractionally crystallized from benzene-hexane to give a sparingly soluble isomer A and a more soluble isomer B whose properties are summarized in the table.

| Isomer, M.P.,° C. | Vinyl analysis [1], percent | Dioxane solubility |
| --- | --- | --- |
| A, 156–169 | 18.15 | Nil. |
| B, 112–114 | 18.35 | About 30%. |

[1] Calculated value: 18.35%. (Determined by the dodecyl mercaptan method described in the Chemistry of Acrylonitrile, The American Cyanamid Co., Seconded., N.Y. 1959, p. 61.)

Elemental Analysis.—Calculated for $C_{10}H_{18}N_2O_4S_2$ (percent): C, 40.79; H, 6.16; N, 9.51; S, 21.78. Found (percent): Isomer A, C, 40.56; H, 7.14; N, 9.20; S, 21.30; Isomer B, C, 40.58; H, 6.27; N, 9.30; S, 21.64.

EXAMPLE IV

1,4-bis-(vinylsulfonyl)-2-methylpiperazine

A solution of 2-methylpiperazine (93 g., 0.93 m.) triethylamine (395 g., 3.92 m.) and hydroquinone (3 g.) in acetone (3500 ml.) was chilled to −10° C. to 2-chloroethylsulfonyl chloride (319 g., 1.96 m.) was added to the solution dropwise with vigorous stirring while maintaining the internal temperature at −10° C. When the addition was complete, the solution was stirred at −10° for one hour, permitted to warm to room temperature and left overnight.

Triethylamine hydrochloride (569 g., calc. 540 g.) was removed by filtration, and the filtrate was stripped of solvent to give the crude bis-vinylsulfonamide (320 g.) as an oily residue. Crystallization from benzene-hexane gave white prisms, M.P. 112–114° C. (65 g., 25% yield). This sample showed 19.05% vinyl (calc. 19.3%) by the dodecyl mercaptan method. Its infrared spectrum ($CHCl_3$ solution) showed maxima at 7.45 and 8.70 ($SO_2$) and 10.32μ (vinyl). A recrystallized sample was submitted for elemental analysis:

*Analysis.*—Calc. (percent): C, 38.56; H, 5.75; N, 9.99; S, 22.80. Found (percent): C, 38.93; H, 6.30; N, 10.38; S, 24.72.

EXAMPLE V

1,4-bis-(2-methoxyethyl sulfonyl)-2-methylpiperazine 2-methylpiperazine (14.0 g., 0.14 m.) and triethylamine (28.5 g., 0.28 m.) were dissolved in chloroform (84 ml.) and added dropwise during one-half hour to a solution of 2-methoxyethylsulfonyl chloride (50 g., 0.315 m.) and hydroquinone (0.05 g.) in benzene (112 ml.) while maintaining the reaction temperature at 0–5° C. with cooling. At the completion of the addition, the reaction mixture was permitted to stir one-half hour at 5° C., warmed to room temperature and filtered free of triethylamine hydrochloride (38.4 g., calc. 38.4 g.). The solvents were removed in vacuo to give the product as an amber syrup (48.3 g.). The product was purified for analysis by crystallization from benzene-hexane to give colorless crystals, M.P. 80–81°.

*Analysis.*—Calc. (percent): C, 38.35; H, 7.25; N, 8.13; S, 18.61. Found (percent): C, 39.27; H, 7.17; N, 8.53; S, 19.02.

EXAMPLE VI

1-(3-methoxypropionyl)-4-vinylsulfonyl) piperazine

1(3-methoxypropionyl) piperazine (17.2 g., 0.1 m.) was dissolved in water (250 ml.) containing potassium bicarbonate (22 g., 0.22 m.). The solution was cooled to 5° C. and 2-chloroethylsulfonyl chloride (17.9 g., 0.11 m.) added dropwise while maintaining the reaction temperature at 2–5° C. After the addition was completed, the solution was permitted to stand overnight, then was acidified by the addition of 10% hydrochloric acid (20 ml.). The product was isolated as a light amber syrup by chloroform extraction. It's purity was 87% as determined by vinyl analysis by mercaptan addition. It's infrared spectrum ($CHCl_3$ solution) showed maxima at 6.15 (carbonyl), 7.43, 8.70 (sulfone), 9.01 (methoxyl) and 10.4μ (vinyl).

*Analysis.*—Calc. (percent): C, 45.7; H, 6.84; N, 10.65. Found (percent): C, 45.07; H, 7.18; N, 10.38.

EXAMPLE VII

N-methylvinylsulfonamide 2-chloroethylsulfonyl chloride (163 g., 1.0 m.) and hydroquinone (1 g.) were dissolved in N,N′-dimethylformamide (500 ml.) and the resulting solution cooled to −40° C. Methyl amine (93.2 g., 3.0 m.) was added as a gas while maintaining the reaction temperature at −40 to −50° C. The reaction was permitted to stir while warming to room temperature. Methylamine hydrochloride was removed by filtration and the filtrate was fractionally distilled in vacuo to give N-methylvinyl sulfonamide as a yellow liquid, B.P. 104–108° C. (0.1–0.2 mm.) in 39% yield. The product has a refractive index at 26° C. of 1.4702 and a purity of 85% as determined by vinyl analysis.

A redistilled sample was analyzed:

*Analysis.*—Calcd. (percent): C, 29.88; H, 5.78; N, 11.57; S, 26.40. Found (percent): C, 29.53; H, 5.96; N, 11.62; S, 26.26.

EXAMPLE VIII 1,3,5-tris(vinylsulfonyl)hexahydro-1,3,5-triazine

Vinyl sulfonamide (27 g., 0.25 m.), formaldehyde (37% aqueous, 20.3 g., 0.25 m.) and sulfuric acid (0.4 g.) were dissolved in water (10 ml.) and heated together at 75–77° C. for 5 hours. The mixture was cooled to room temperature, diluted with water, and the pH adjusted to 5.5. The solution was extracted with chloroform and the product recovered by evaporation of the organic solvent. The triazine (12.8 g., 43% yield) was recovered as a pale yellow syrup whose purity was found to be 94% as determined by vinyl analysis.

The infrared spectrum (CHCl$_3$ solution) of the product showed maxima at 7.50, and 8.73 (SO$_2$) and 10.33$\mu$ (vinyl).

EXAMPLE IX 1,3,5-tris (2-methoxyethyl sulfonyl) hexahydro-1-3-5 triazine 2-methoxyethyl sulfonamide (4.0 g., 0.0288 m.), formaldehyde (37% aqueous, 2.33 g., 0.0288 m.) and sulfuric acid (0.1 g.) were combined and heated at 70–80° C. for three hours. The mixture was cooled to room temperature, diluted with water (10 ml.) and adjusted to pH 6.0 by the addition of potassium bicarbonate. The solution was extracted with chloroform and the product recovered as a pale yellow syrup (3.5 g.). The yield was 80%.

The compounds illustrated in the foregoing examples as well as those compounds included in Formulae I to VIII set forth above are valuable intermediates for various purposes, particular chemical synthesis, and as monomers for the formation of polymers and further, have utility in the therapeutic field. More importantly, they are particularly useful as reagents for the chemical modification of polymers and especially so for the crosslinking and chemical modification of cellulosic textile materials. For example, the grouping YSO$_2$N< has excellent reactivity toward hydroxyl groups in the presence of alkaline catalysts and polyfunctional compounds such as those shown in Formulae III, IV and V, are excellent crosslinking agents for cellulosic textiles and impart desirable properties thereto such as improved resilience and dimensional stability which are particularly important in the textile field.

Unsymmetrical polyfunctional compounds such as those shown in Formula VI can be employed to crosslink polymers containing active hydrogen atoms in a stepwise process. For example, the initial reaction between a cellulosic textile and a compound of Formula VI can be achieved by carrying out the reaction in the presence of alkaline catalysts. Subsequently the remaining grouping can be reacted with the cellulosic textile material by changing the reaction conditions and employing an acidic catalyst sufficient to lower the pH below 7.

In addition to being useful for the crosslinking of various polymeric materials containing active hydrogen atoms, the sulfonamide compounds of the present invention are also useful for introducing other modifying groups into polymers and are particularly interesting for their wide applicability in the textile field. For example, if the monofunctional compounds such as are included in Formulae VII and VIII contain terminal groupings that are hydrophobic or oil repellent, textiles can be treated therewith in order to impart these properties to the textile.

What is claimed is:
1. Bis(2-methoxyethanesulfonyl)piperazine.
2. 1,4-bis-(2-methoxyethylsulfonyl)-2-methylpiperazine.

References Cited

UNITED STATES PATENTS

| | | | |
|---|---|---|---|
| 500,665 | 7/1893 | Marckwald | 260—268 |
| 2,445,319 | 7/1948 | Engelbrecht | 260—556 X |
| 2,507,408 | 5/1950 | Jacob | 260—268 |
| 3,184,447 | 5/1965 | Paquette | 260—268 |
| 3,342,821 | 9/1967 | Louthan | 260—268 |
| 3,376,299 | 4/1968 | Kuhne | 260—247.1 |

DONALD G. DAUS, Primary Examiner

U.S. Cl. X.R.

8—120; 260—239, 248, 293.4, 294.8, 309.7, 326.82, 327, 556